July 16, 1929.  E. D. TILLYER  1,721,194
OPHTHALMIC LENS
Filed Nov. 8, 1926

Inventor
Edgar D. Tillyer.
By Harry H. Styll.
Attorney

Patented July 16, 1929.

1,721,194

UNITED STATES PATENT OFFICE.

EDGAR D. TILLYER, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

OPHTHALMIC LENS.

Application filed November 8, 1926. Serial No. 147,039.

The present invention relates to ophthalmic lenses and has particular reference to a re-inforced lens and method of making same.

The principal object of the invention is to provide re-inforcing rims for ophthalmic lenses to avoid breaking the lenses and avoid scratching and blurring their highly polished surfaces.

Another object of the invention is to provide lenses with re-inforcing rims that will be as inconspicuous as possible when on the face of the wearer and which may be mounted upon the lens support in any desired position without the necessity of perforation or indentation.

Another object of the invention is to provide means whereby cylindrical or prismatic lenses worn to correct astigmatism and muscular deformities or derangements of the eyes may be properly positioned with respect to the eyes of the wearer and at a fixed meridian.

A further object of the invention is to provide lenses with re-inforcing rims which do not project into the field of vision.

A further object is to provide simple, durable and economical means that may be snapped over or cemented around the edge of the lens to reinforce same.

Other objects and advantages should become apparent during the course of the following description taken in connection with the accompanying drawings and it will be understood that I may make any modifications in the details of construction and methods of making the same without departing from or exceeding the spirit of the invention as set forth in the accompanying claims. The preferred forms of the invention only have been shown and described by way of illustration.

Referring more particularly to the drawings.

Prior to the present invention ophthalmic lenses have been positioned within reinforcing rims, but they have been mostly in the form of an ophthalmic frame of metal, celluloid and other opaque materials that project into the field of vision and in which the lenses often become loose and move about during their continued use. This movement of lenses has a very serious effect in cases where lenses such as cylindrical and prismatic lenses are being worn to correct astigmatism or muscular deformities or derangements of the eyes, as the axis or axes of such lenses compensating for the deviations from the normal spherical curvature or muscular deformities or derangements may lie in any meridian and the lenses must, therefore, be adjusted accurately relative to the bridge to assume their proper positions and must remain on that fixed meridian to have their corrective or curative action as the case may be.

With the present invention these difficulties are obviated as the rims are formed of a transparent material such as glass and are snapped over, fused or cemented to the periphery of the lens so that the lens will remain fixed within the rim when positioned in an ophthalmic mounting. The ophthalmic mounting is formed by clamping or cementing the lens rims in suitable clamp members formed on the ends of the bridge and on a meridian necessary for the correction of the eye.

Various efforts have been made to provide lens mounts of this character but they have evolved many disadvantages especially in the process of manufacture.

The present invention, however, obviates these difficulties by providing separate lens rims that may be snapped over, fused or cemented to the periphery of the finished lenses and which may be placed on the lenses by an optician or dispenser after said lenses have been ground and polished ready to perform their optical functions. Any colored rims may be used if desired as this invention does not reside merely in the utilitarian aspect, but largely in the fancies of the individuals.

Referring more particularly to the drawings, the invention resides mainly in providing a separate rim 11 that may be snapped over, fused or cemented to the periphery of the lens 10 to reinforce the lens and protect its highly polished surfaces.

Figure 1:
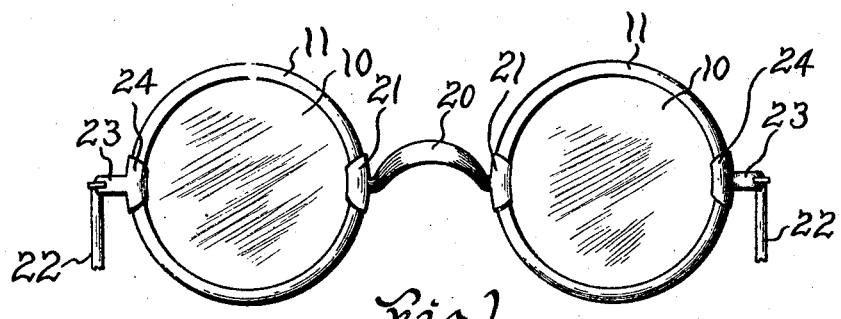
Figure 1 is a front elevation of an ophthalmic mounting constructed with the improved lens.
Figure 2:
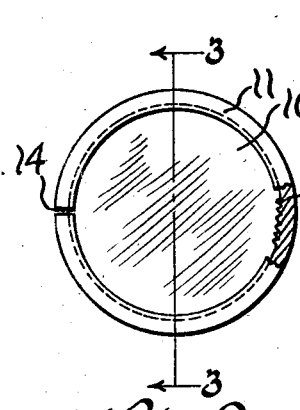
Figure 2 is a front elevation of the lens with the rim partly shown in section.
Figure 3:
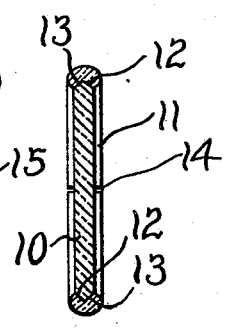
Figure 3 is a section on line 3—3 of Figure 2.
Figure 4:
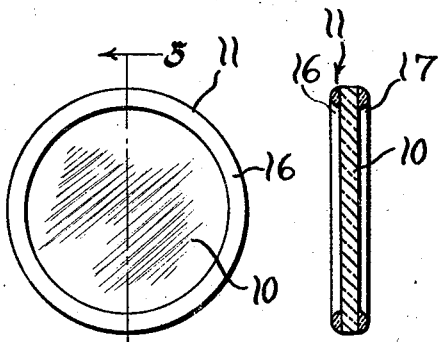
Figure 4 is a front elevation showing a modification of the lens.

In Figures 2 and 3 I preferably take a lens ground and polished on both sides ready to perform its optical function, and form thereon a bevelled edge 12 adapted to fit within the groove 13 formed in the transparent reinforcing rim of glass or the like 11. The rim 11 is split as at 14 so that it may be snapped over and around the edge of the lens 10. When accurately dimensioned the resiliency of the rim member 11 will tend to grip the lens to hold itself in fixed relation with the lens, or it may be cemented or the like to the periphery of said lens if desired. In either case the lens 10 and rim 11 may be formed with suitable interlocking notches 15 so that the lens will be held against rotation or displacement within said rim member.

Figure 5:
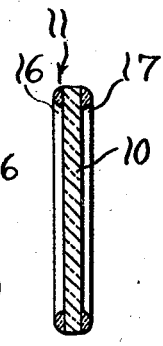
Figure 5 is a section on line 5—5 of Figure 4.

While I have referred to one particular form of rim that may be positioned around the periphery of the lens 10, other forms may be used, such as shown in Figures 5, 6, 7 and 8. In Figure 5, I preferably edge the lens 10 to a size equal to the outside diameter of the split rim members 16 and 17, after which they may be cemented or fused to the inner and outer faces of said lens thereby forming the reinforcing rim 11. The split rim members 16 and 17 may also be cemented or fused to the lens prior to the edging operation, after which the lens may be edged to any peripheral shape or size.

Figure 6:
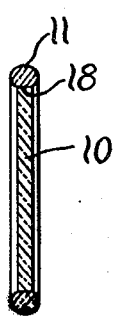
Figures 6, 7 and 8 are similar views showing further modifications.

Figure 6 shows another modification in which the rim member 11 has the flat surface 18 formed on its inner face which is adapted to be cemented or the like to the periphery of the lens. In this instance the lens is edged to a diameter equal to the inside diameter of the rim member 11 so that it will fit snugly within the rim. The inner portion of the rim member 11 may also be made slightly smaller in diameter than the diameter of the lens if desired, and may be heated and expanded so that it may be placed over the lens and allowed to shrink and firmly position itself around the periphery of said lens, obviating the fusing or cementing of the rim thereon.

Figure 7:
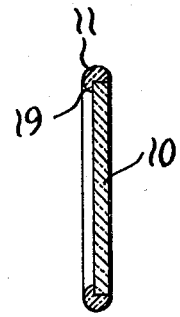

Figure 7 shows a further modification in which the lens 10 is edged as aforementioned, and the rim 11 fitted to its periphery. The rim 11 is formed with the shoulder 19 which is adapted to contact with the front face of the lens 10 and accurately position the rim relative to the lens. The lens may be held in the rim as aforementioned in the previous constructions.

Figure 8:
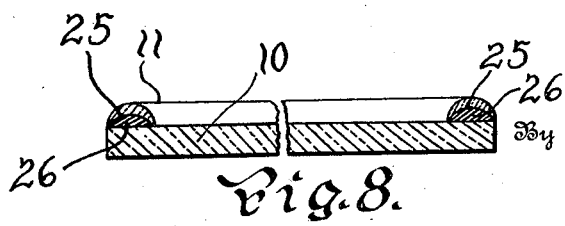

Figure 8 shows a further modification similar to Figure 5, in which only one of the split rim members is positioned on the outer face of the lens 10 to form the rim 11. In this instance the split rim member 11 is formed with the groove 25 in which various colored cements or the like 26 may be used when mounting the transparent rim of glass or the like on the lens 10, thereby forming different colored rims.

Gold or silver foil may also be placed within the groove 25 prior to mounting the rim 11 on the lens to give said rim the appearance of a gold or silver rim.

The aforementioned ideas for forming different colored rims may be used in connection with any of the previously described constructions if desired, so I do not wish to limit myself to any specific construction.

In forming an ophthalmic mounting the lenses 10 having the rims 11 positioned thereon are adjusted to the accurate meridian to which the bridge 20 is to be attached so that the cylindrical or prismatic lenses will be accurately positioned as aforementioned. The bridge 20 is provided with suitable clamp members 21 in which the rim 11 may be clamped or cemented to hold the lens.

Suitable temples 22 are mounted in the end piece connections 23 which are formed with similar clamp members 24 adapted to be positioned on the rims 11 in alignment with the bridge 20 to hold the lenses before the eyes of the wearer.

Although the reinforcing rims have been described as being position on ophthalmic lenses, they may be positioned on any type of lens that may require reinforcement and protection against scratching and blurring of their highly polished surfaces.

From the foregoing description it should be apparent that I have provided separate reinforcing means which may be mounted on a finished lens to reinforce same without marring its optical surfaces and which will not project into the field of vision, but will still have the strength and advantages of the prior art ophthalmic frames. Another added feature is that the lenses can not move out of adjustment when properly placed in the mounting.

Having described my invention, what I claim is:

1. A lens comprising a shaped lens body of one piece of lens glass and a solid bead of a second piece of lens glass secured to one of the faces of the body portion and following the contour of the shaped edge thereof.

2. A lens comprising a shaped lens body of one piece of lens glass and a solid bead of another piece of lens glass fused to one of the lens faces of the body portion and following the contour of the shaped edge thereof.

EDGAR D. TILLYER.